Feb. 15, 1938.   H. E. TWOMLEY   2,108,356
VARIABLE SPEED MECHANISM
Filed Jan. 14, 1936   5 Sheets-Sheet 1

INVENTOR.
Herbert E. Twomley
BY Lyon & Lyon
ATTORNEYS

Feb. 15, 1938.   H. E. TWOMLEY   2,108,356
VARIABLE SPEED MECHANISM
Filed Jan. 14, 1936   5 Sheets-Sheet 2

INVENTOR.
Herbert E. Twomley
BY Lyon & Lyon
ATTORNEYS

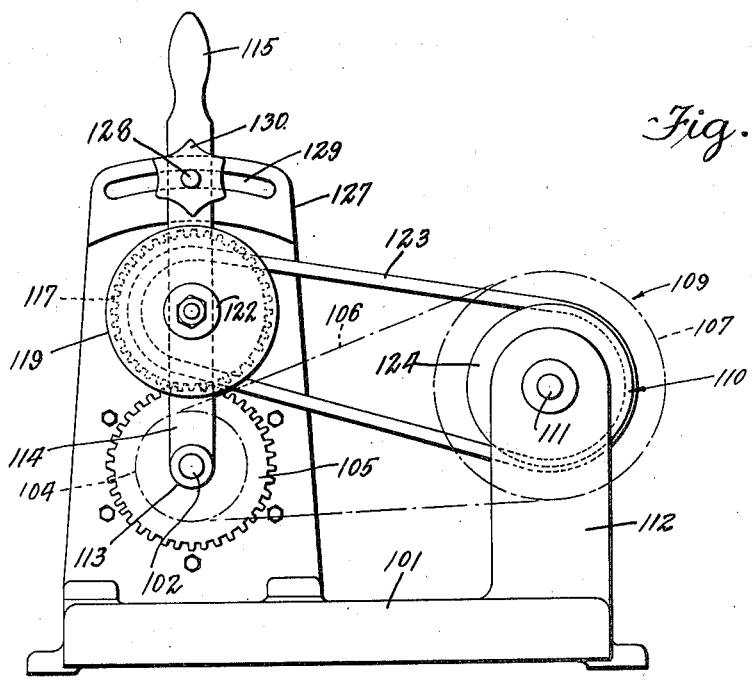
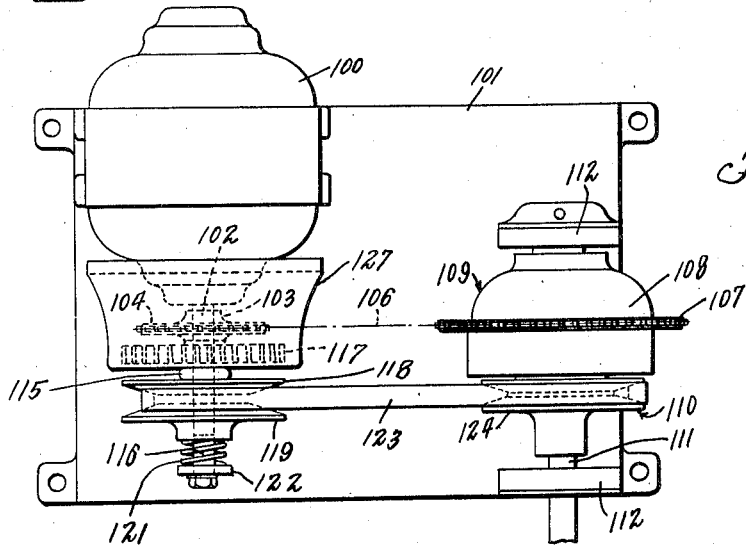

Patented Feb. 15, 1938

2,108,356

UNITED STATES PATENT OFFICE 2,108,356

VARIABLE SPEED MECHANISM

Herbert E. Twomley, Riverside, Calif., assignor to Food Machinery Corporation, San Jose, Calif., a corporation of Delaware Application January 14, 1936, Serial No. 59,065

9 Claims. (Cl. 74—230.17)

This invention relates to speed changing mechanisms in which the ratio of the speeds of a driving and a driven member may be varied by any desired small increments within predetermined limits.

The invention relates more particularly to speed reducing mechanisms of the type employing a differential unit consisting of three members, one of which rotates slowly in response to simultaneous rotation of the other two members in opposite directions at higher speeds, and an object of the invention is to provide a practicable mechanism for efficiently driving two members in opposite directions at inversely variable speeds from a single drive shaft.

Other more specific objects and features of the invention will appear from the following detailed description which refers to the drawings.

In the drawings:

Fig. 7 is a front elevation view showing still another embodiment of the invention;

Fig. 8 is a plan view of the mechanism shown in front elevation in Fig. 7; and

Figure 1:
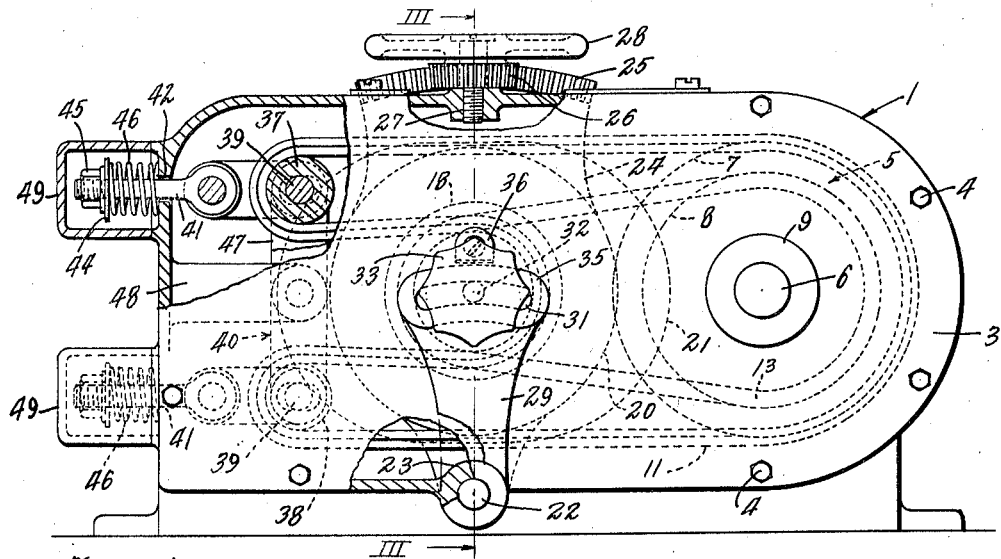
Fig. 1 is a front elevation view, with portions broken away, of one form of variable speed mechanism in accordance with the invention.

Referring to Figs. 1 to 4, inclusive, the mechanism therein depicted comprises an inclosing case 1 which may consist of side, bottom, top, and rear walls formed integrally as a unit 2, and a front wall 3 adapted to be secured to the member 2 as by bolts 4.

The case 1 encloses and supports a differential unit 5 consisting of a shaft 6 and a pair of rotatable members 7 and 8, respectively. The shaft 6 is rotatably supported in journals 9 in the rear and front walls of the case 1 and the members 7 and 8 may be rotatably supported upon the shaft 6. Each of the members 7 and 8 is so coupled to the shaft 6 that the shaft 6 is rotated slowly in one direction in response to relatively rapid rotation of the members 7 and 8 in opposite directions. Differential mechanisms of the type described are old and well known in the art and the particular mode of coupling the various members of the differential together to get the result stated does not constitute a part of the present invention and will therefore not be described in detail.

Each of the differential members 7 and 8, respectively, has a pair of V grooves extending about its periphery, adapted to be engaged by drive belts 10, 11, 12, and 13, respectively, which belts are driven by drive pulleys next to be described.

Figure 2:
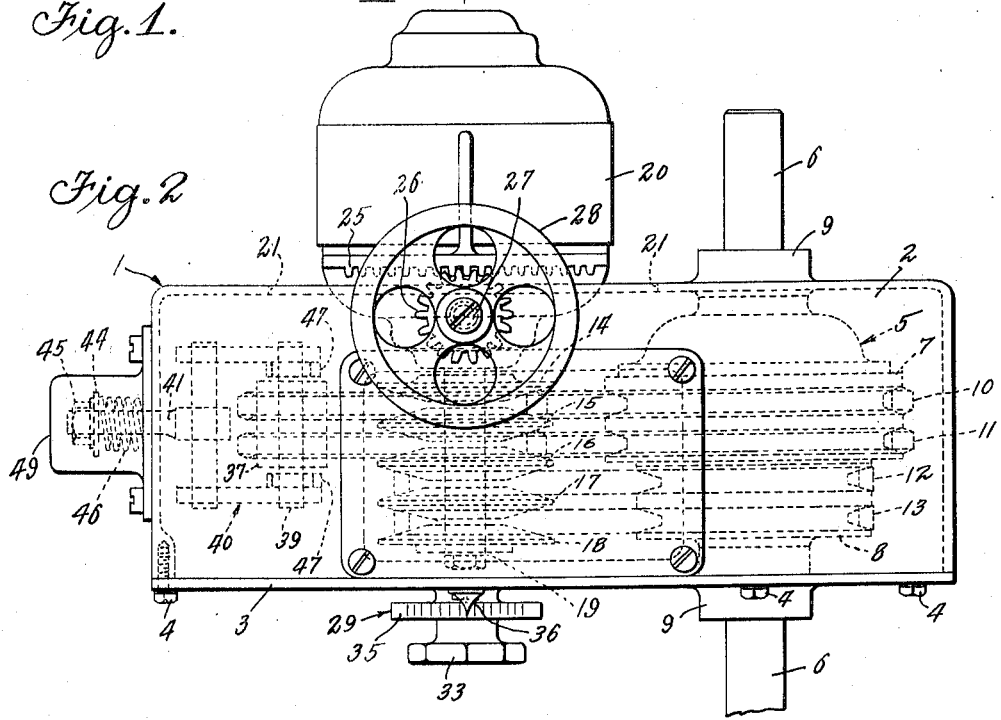
Fig. 2 is a plan view of the mechanism shown in Fig. 1.

The drive pulleys mentioned comprise a plurality of V pulley elements 14, 15, 16, 17, and 18 mounted upon the shaft 19 of an electric motor 20. The main body of the motor is mounted exterior of the case 1 but the inner end of the motor projects into the casing through an opening 21 in the rear wall of the casing. The motor 20 is rigidly secured to the rear end of a shaft 22 which extends through the casing 1 and is freely rotatable in a sleeve 23 anchored to the casing. By oscillating shaft 22 in the sleeve 23 the motor 20 may be shifted to move the shaft 19 toward or away from the differential unit 5, thereby varying the tension on the various belts 10 to 13, respectively. To facilitate adjustment of the motor 20, the latter has attached thereto a frame member 24 bearing an arcuate gear segment 25 adapted to be engaged by a pinion 26 rotatably supported on a bearing member 27 secured to the casing 1. A hand wheel 28 is provided on the pinion 26 for rotating the latter to shift the motor. To retain the motor in any desired position to which it has been moved by rotation of the hand wheel 28, an arm 29 is provided on the forward end of the shaft 22, this arm being keyed to the shaft for rotation therewith and extending upwardly adjacent the front wall 3 of the casing 1. At its upper end the arm 29 is provided with an arcuate slot 31, through which a screw 32 extends, and is threaded into an aperture provided therefor in the wall 3. The screw 32 is preferably provided with a hand knob 33 and by turning this knob the arm 29 may be rigidly clamped against the wall 3, thereby retaining it in whatever position to which it has been moved. To indicate the position of the motor, the upper end 35 of the arm 29 may be calibrated as shown in Fig. 2, the calibrations cooperating with a pointer 36 secured to the wall 3 of casing 1.

The belts 12 and 13 extending from the differential unit 8 are looped directly over the V pulleys defined by pulley members 16, 17, and 18 so that rotation of the latter members rotates the differential member 8 in the same direction. These belts 12 and 13 may be ordinary V belts.

It is desired that the differential member 7 be rotated in a direction opposite to the direction of rotation of the motor shaft 19. To this end, the belts 10 and 11 are of the double V type and are reverse looped from a pair of idler pulleys 37 and 38, respectively, back over the same V pulleys defined by the pulley elements 14, 15, and 16 on the motor shaft 19. The idler pulleys 37 and 38 are preferably flat face pulleys, each mounted on an axle 39 supported at opposite ends by a yoke 40 which is in turn supported by a rod 41 extending through apertures 42 provided therefor in the case 1. The bolts 41 are provided on their outer ends with washers 44 and nuts 45, and helical springs 46 are compressed between the washers 44 and the casing member surrounding the apertures 42 to urge the pulleys 37 and 38 in such direction as to maintain the belts 10 and 11 taut at all times. To prevent vertical displacement of the pulleys 37 and 38, guide members 47 are provided which have horizontal slots therein for receiving the axles 39, these members 47 being supported by an arm 48 extending from the end wall of the casing 1.

The casing 1 may be extended as shown at 49 to form enclosures for the springs 46 and bolts 41.

It will be apparent from the foregoing description that the belts 13 and 12 extend away from the motor shaft 19 in one direction and that the belts 10 and 11 extend away from the motor shaft in the opposite direction. Therefore, if the motor shaft and motor are shifted by turning the hand wheel 28, one pair of belts will be tightened and the other will be loosened.

Figure 3:
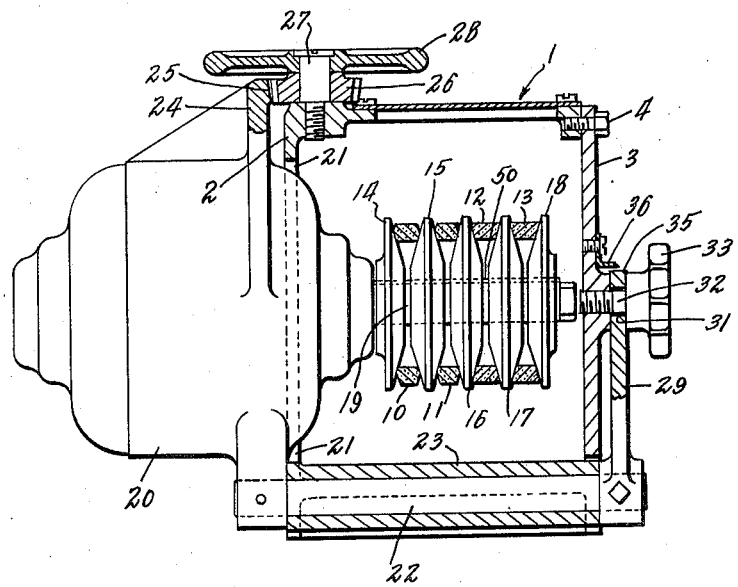
Fig. 3 is a sectional view of the mechanism shown in Figs. 1 and 2, the section being taken in the plane III—III of Fig. 1.
Figure 4:
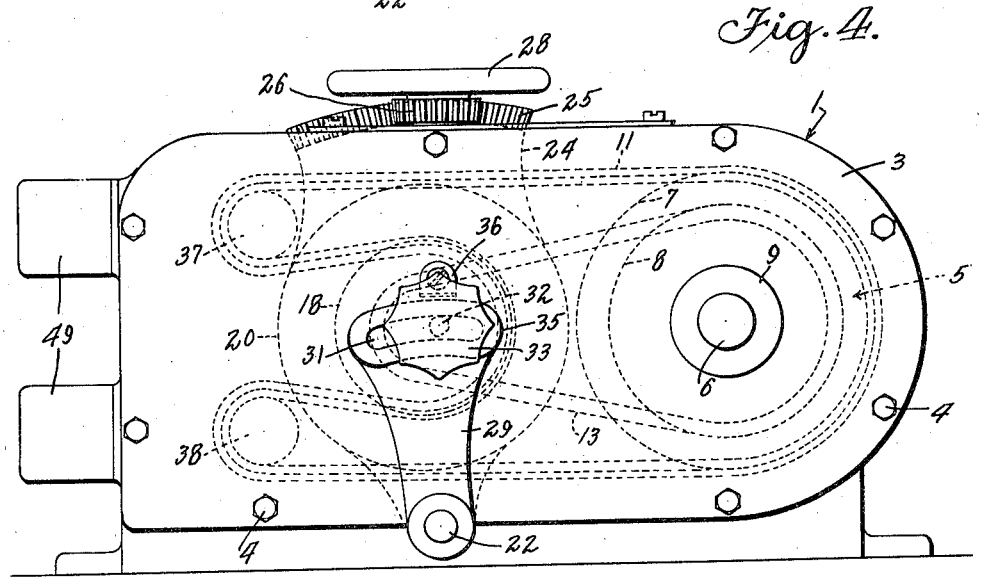
Fig. 4 is a front elevation view of the same mechanism shown in Fig. 1 in a different position of adjustment.

Referring now to Fig. 3, the outside pulley members 14 and 18 on the motor drive shaft 19 are fixed rigidly to the shaft 19. The pulley members 15, 16, and 17, however, are slidable longitudinally on the shaft 19 although they are constrained to rotate with the shaft 19 by a spline 50. The longitudinal positions of members 15, 16, and 17 vary according to the tension of the various belts. Thus tightening any one of the belts tends to spread the two pulley members which engage that belt. Normally the spreading force of the belts 10 and 11 is balanced by the spreading force of belts 12 and 13 so that the members 15, 16, and 17 retain fixed longitudinal positions. However, if the motor 20 is shifted in such direction as to tighten the belts 10 and 11 and loosen the belts 12 and 13, then the force tending to separate pulley members 14 and 15 and 15 and 16 is increased and the force of belts 12 and 13 tending to separate the pulley members 16 and 17 and 17 and 18 is decreased. Accordingly, under these conditions the pulley members 15, 16, and 17 will move to the right (with reference to Fig. 3). This movement permits the belts 10 and 11 to ride in closer to the shaft 19 and forces the belts 12 and 13 to ride out further from shaft 19. As a result, the effective diameters of the pulley members engaging belts 10 and 11 are decreased and the effective diameters of the pulley members engaging belts 12 and 13 are increased, thereby effecting a variation in the speeds at which the differential members 7 and 8, respectively, are rotated. Obviously by shifting the motor in the opposite direction, the relative speeds of the differential members 7 and 8 are varied in the opposite direction.

As a result of the shifting of the pulley members 15, 16, and 17, the belts will be thrown slightly out of alignment in some positions of adjustment. However, this is not serious. By making the idler pulleys 37 and 38 with smooth cylindrical surfaces as shown, the belts 10 and 11 can adjust themselves laterally along these pulleys in response to movement of the pulley members on the motor shaft.

Figure 5:
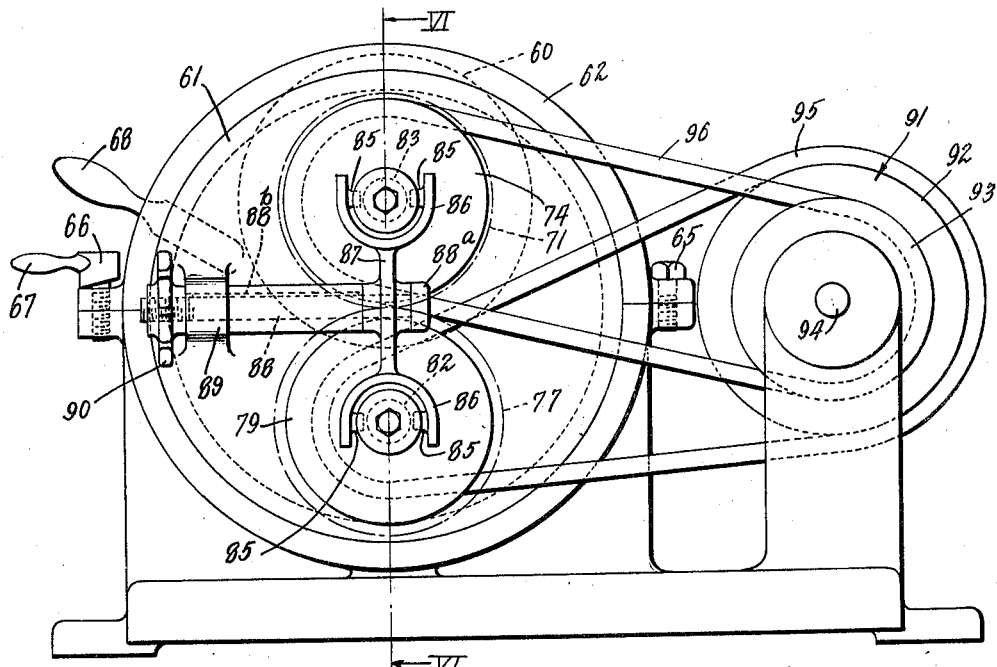
Fig. 5 is a front elevation view of another embodiment of the invention different from that disclosed in Figs. 1 to 4.
Figure 6:
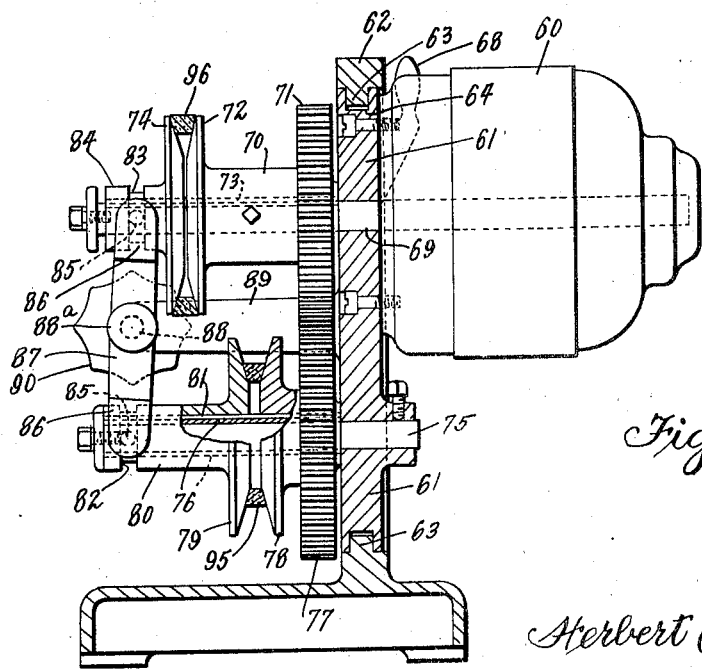
Fig. 6 is a sectional view of the mechanism shown in Fig. 5, the view being taken in the plane VI—VI of Fig. 5.

Referring now to Figs. 5 and 6, the embodiment therein depicted differs from that previously described with reference to Figs. 1 to 4 in that the idler pulleys are dispensed with and the drive pulleys, instead of being both mounted on the motor shaft, are positioned one on the motor shaft and the other on a counter shaft driven in the direction opposite to the motor shaft by spur gears.

In this instance the motor 60 is rigidly secured to a circular plate 61 which is rotatably mounted in a split ring 62, the ring having a tongue 63 engaging a groove 64 in the plate 61 to positively lock the plate against end movement. The two halves of the split ring 62 may be flanged and the flanges joined together at one end by a bolt 65 and the two halves may be releasably clamped together at the other end by a screw 66 having a lever handle 67. By loosening the screw 66, the disc 61 may be rotated within the ring 62 and then clamped in any desired position to which it has been moved by tightening the screw 66. To facilitate shifting the plate 61, the latter may be provided with a handle 68 extending therefrom.

The drive shaft 69 of the motor 60 extends through the plate 61 and has mounted thereon a hub 70 which carries a spur gear 71 at one end and one half 72 of a V pulley at the other end. The hub 70 may be restrained from rotation with respect to the shaft 69 by a spline 73, which spline extends beyond the pulley member 72 and also prevents rotation of the other half 74 of the V pulley which is slidably mounted for longitudinal movement on the shaft 69. By sliding the pulley member 74 toward or away from the pulley member 72, the effective diameter of the pulley may be increased or decreased at will.

Anchored to the plate 61 below the motor shaft 69 is a fixed shaft 75 which extends outwardly from the plate substantially the same distance as does shaft 69. The shaft 75 rotatably supports a sleeve member 76 which has formed integrally therewith or rigidly attached thereto a spur gear 77 meshing with the gear 71 and one half 78 of a V pulley. The other half 79 of the V pulley forms a part of a sleeve 80 which is slidable longitudinally on the sleeve 76 but is forced to rotate therewith by a spline 81.

It is desired that when either one of the V pulleys described increases its effective diameter that the effective diameter of the other be correspondingly reduced. To this end, a groove 82 is provided in the outer end of sleeve 80 and a groove 83 is provided in the outer end of a sleeve 84 to which the pulley member 74 is attached. These grooves 82 and 83 are engaged by pins 85 on shifter forks 86 which are mounted on the opposite ends of a lever 87. Lever 87 is rotatably mounted upon a shaft 88 journaled in a frame member 89 which is anchored to the plate 61.

The lever 87 is restrained against longitudinal movement on the shaft 88 by a head 88a on the outer end of shaft 88 and by the end of the member 89 which it contacts. A hand wheel 90 is threaded upon the left end of shaft 88 and when tightened functions to lock the lever 87 between the head 88a and the end of the frame member 89 so as to prevent free oscillation of the lever 87. To prevent rotation of the shaft 88 in response to rotation of the hand wheel 90, the shaft may be provided with a spline 88b which is engaged by a cooperating groove in the frame member 89.

The differential unit, indicated generally at 91 in Fig. 5, is of exactly the same type as the differential unit 5 in Figs. 1 to 4 and comprises two members 92 and 93 which when rotated at different speeds in opposite directions rotate a central shaft 94 slowly in one direction. The members 92 and 93 are provided with peripheral V grooves to engage V belts 95 and 96, respectively. Belt 96 is engaged between the pulley members 72 and 74 on the motor shaft 69 and the belt 95 is engaged between the pulley members 78 and 79 which are driven by the spur gears 77 and 71 from the motor shaft 69 but in the opposite direction. Accordingly, the differential members 92 and 93 will be rotated in opposite directions in response to rotation of the motor shaft.

To inversely vary the speeds of the differential members 92 and 93, the screw 66 and the hand wheel 90 are loosened and the plate 61 rotated slightly by means of the handle 68. Assuming that the plate 61 is rotated in a clockwise direction (with reference to Fig. 5), belt 96 will be loosened and belt 95 will be tightened. This causes the pulley member 79 to move away from the pulley member 78, which movement is transmitted through the lever 87 to the pulley member 74, causing it to approach the pulley member 72, thereby decreasing the effective diameter of the pulley defined by members 78 and 79 and increasing the effective diameter of the pulley defined by members 72 and 74. When the desired adjustment is obtained the screw 66 and the hand wheel 90 are tightened, thereby preventing any further variation in the adjustment.

Figure 9:
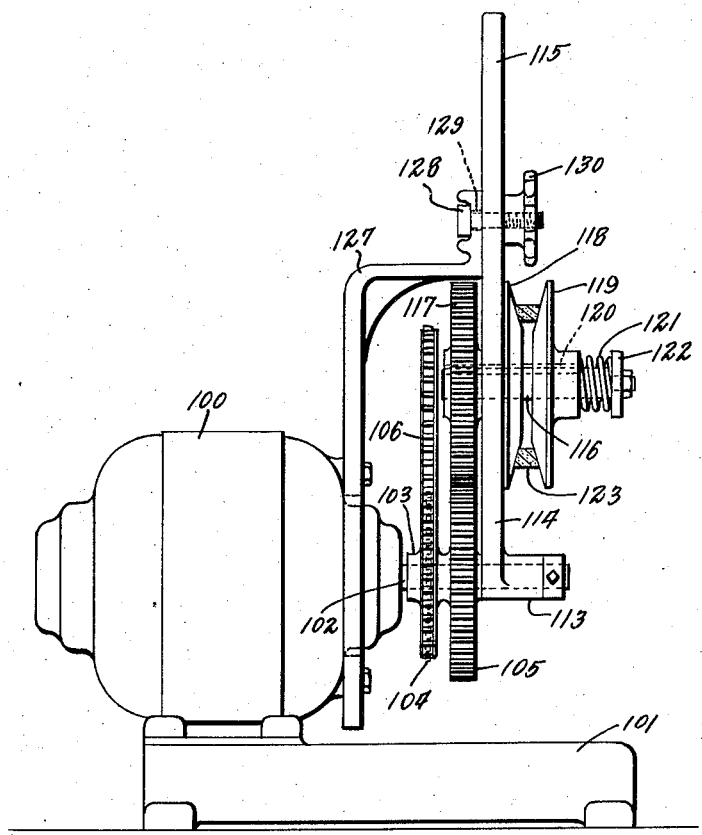
Fig. 9 is a side elevation of the mechanism shown in Figs. 7 and 8.

Referring now to Figs. 7, 8, and 9, the mechanism therein disclosed is somewhat similar to that just disclosed with reference to Figs. 5 and 6 but differs therefrom in that only one variable diameter V pulley is employed, the direct drive from the motor shaft to one of the differential units being through a chain. In this arrangement the speed of one of the differential units is constant at all times but the speed of the other unit may be varied.

The mechanism comprises a motor 100 mounted in fixed position on a base 101 and having a shaft 102 to which is rigidly attached a hub 103 and a sprocket 104 and a spur gear 105. The sprocket 104 is coupled by a chain 106 to a sprocket 107 on one member 108 of a differential unit 109 which is of the same type described with reference to Figs. 1 to 4. Thus the unit as shown in Fig. 8 comprises a member 108 and a member 110 rotatably mounted upon a shaft 111 which in turn is rotatably supported in journals 112 on the base 101, the different members being so coupled together that rapid rotation of members 108 and 110 in opposite directions rotates the shaft 111 slowly in one direction.

Mounted for free rotation upon the motor shaft 102 just outside of the spur gear 105 is a hub 113 which supports an arm 114, the latter extending upwardly and terminating in a handle 115. Arm 114 has journaled therein a shaft 116, which shaft supports, on opposite sides of arm 114, a spur gear 117 and a pair of V pulley members 118 and 119, respectively. The spur gear 117 meshes with the spur gear 105 on the motor shaft 102. The pulley member 118 is rigidly attached to shaft 116 but the pulley member 119 is longitudinally slidably mounted upon shaft 116. Member 119, however, is forced to rotate with shaft 116 by virtue of a spline 120 on the shaft. Pulley member 119 is constantly urged toward pulley member 118 by a helical spring 121 compressed between member 120 and a washer 122 on the outer end of shaft 116. The V pulley defined by members 118 and 119 is coupled by a V belt 123 to the differential member 110, the latter having a fixed V pulley 124 thereon for that purpose.

In the arrangement described the tension of the belt 123 tends to separate the pulley members 118 and 119, thereby decreasing the effective diameter of the pulley. Opposing this force is the force of the spring 121 which constantly urges the two pulley members together. In normal operation a condition of equilibrium exists in which the separating force applied by the belt is equal to the force exerted by the spring 121. However, the effective diameter of the pulley may be varied by shifting the arm 114 to carry the shaft 116 either toward or away from the differential unit 109. Such shifting is readily performed by means of the handle 115. However, to restrain the arm in any position of adjustment to which it has been moved, a locking device is provided which consists of a frame member 127 which is anchored to the frame of motor 100 and extends upwardly and forwardly over the gear 117 into alignment with the inner face of arm 114. A bolt 128 extends through a slot 129 in the frame member 127 and has a hand nut 130 threaded thereon which, when tightened, clamps the arm 114 firmly against the frame 127.

Shifting the shaft toward the differential unit 109 reduces the tension on the belt, thereby permitting the spring 121 to move the pulley member 118, increasing the effective diameter of the pulley until the tension of the belt is sufficient to develop a spreading force between the pulley member equal to the force exerted by the spring 121, thereby creating a condition of equilibrium. Conversely, shifting shaft 116 away from the differential unit, tightens the belt, thereby spreading the members 118 and 119 and reducing the effective diameter of the pulley until a new state of equilibrium is reached.

For purposes of illustration, several modifications of the invention have been described. It is understood, however, that many other variations in addition to those shown may be made without departing from the spirit of the invention and the invention is therefore to be limited only as set forth in the appended claims.

I claim:

1. A mechanism of the type described comprising in combination a pair of driven members to be driven simultaneously in opposite directions, each having an individual pulley means attached thereto for driving it and the two pulley means being positioned coaxial with each other, motor means having a drive shaft parallel to the axis of said pulley means, a second drive shaft and means rotatably supporting it in parallel relation to and at a fixed distance from said motor drive shaft, intermeshing gears on said drive shafts for rotating said second drive shaft from said motor drive shaft in the opposite direction thereto, pulley means on each of said drive shafts juxtaposed to the respective pulley means on said driven members, belt means for directly coupling said juxtaposed pulley means whereby said driven members are rotated in opposite directions in response to rotation of said motor shaft in one direction, and means for varying the effective diameter of at least one of said pulleys on said drive shafts to vary the relative speeds of said driven members.

2. A mechanism of the type described comprising in combination a pair of driven members to be driven in opposite directions, each having an individual pulley thereon for driving it and the two pulleys being positioned coaxial with each other, motor means having a drive shaft parallel to the axis of said pulley means, a second drive shaft and means rotatably supporting it in parallel relation to and at a fixed distance from said motor drive shaft, intermeshing gears on said drive shafts for rotating said second drive shaft from said motor drive shaft in the opposite direction thereto, a variable diameter V pulley on each of said drive shafts juxtaposed to the respective pulley means on said driven members, and belt means for directly coupling said variable diameter V pulleys to their juxtaposed pulleys on the driven members, each of said variable diameter V pulleys tending to reduce its effective diameter in response to an increase in tension of its associated belt means, means interconnecting said variable diameter V pulleys for increasing the effective diameter of either in response to reduction in the effective diameter of the other, frame means supporting said motor and drive shaft for oscillatory movement as a unit about an axis intermediate said two drive shafts whereby said V pulleys may be moved in directions such as to tighten either belt means and simultaneously loosen the other belt means to inversely vary the effective diameters of the two V pulleys and vary the speeds of said driven members.

3. A mechanism as described in claim 2, with means for locking said V pulleys in any desired position of adjustment, and means for locking said motor and drive shafts against unitary movement about said axis.

4. A mechanism as described in claim 2, in which each of said variable diameter V pulleys comprises a fixed pulley member and a movable pulley member movable longitudinally toward and away from the fixed pulley member, and in which said means interconnecting the said variable diameter V pulleys for increasing the diameter of either in response to reduction in the diameter of the other comprises a lever fulcrumed at a point between said two drive shafts, and means on the opposite ends of said lever engaging the movable members of said two pulleys whereby longitudinal movement of the movable member of either pulley moves the movable element of the other pulley in the opposite direction.

5. A mechanism as described in claim 2, in which said frame means for supporting said motor and drive shafts for oscillatory movement as a unit comprises a circular supporting plate and a stationary expansible ring member for engaging the edges of said circular plate whereby the plate may be rotated by expanding the ring and may be locked in fixed position by contracting the ring.

6. A mechanism of the type described comprising in combination a pair of driven members to be driven simultaneously in opposite directions, each having an individual pulley means attached thereto for driving it and the two pulley means being positioned coaxial with each other, motor means having a drive shaft parallel to the axis of said pulley means, a second drive shaft and means rotatably supporting it in parallel relation to and at a fixed distance from said motor drive shaft, intermeshing gears on said drive shafts for rotating said second drive shaft from said motor drive shaft in the opposite direction thereto, pulley means on each of said drive shafts juxtaposed to the respective pulley means on said driven members, belt means for directly coupling said juxtaposed pulley means whereby said driven members are rotated in opposite directions in response to rotation of said motor shaft in one direction, means for varying the effective diameter of at least one of said pulleys on said drive shafts to vary the relative speeds of said driven members, and means for rotating the shaft of said one pulley about an axis parallel thereto to vary the distance between said one pulley and its associated driven pulley and thereby compensate for variations in belt tension resulting from variations in the effective diameter of said pulley.

7. A mechanism of the type described comprising in combination a pair of driven members to be driven simultaneously in opposite directions, each having an individual pulley means attached thereto for driving it and the two pulley means being positioned coaxial with each other, motor means having a drive shaft parallel to the axis of said pulley means, a second drive shaft and means rotatably supporting it in parallel relation to and at a fixed distance from said motor drive shaft, intermeshing gears on said drive shafts for rotating said second drive shaft from said motor drive shaft in the opposite direction thereto, pulley means on each of said drive shafts juxtaposed to the respective pulley means on said driven members, belt means for directly coupling said juxtaposed pulley means whereby said driven members are rotated in opposite directions in response to rotation of said motor shaft in one direction, said pulley means on said drive shafts being adjustable to vary their effective diameters, means responsive to adjustment of either pulley for oppositely varying the effective diameter of the other pulley, and means for simultaneously moving said two pulleys in opposite directions toward and away from said driven members to tighten either belt means and simultaneously loosen the other belt means to compensate for changes in belt tension resulting from variations in the effective diameters of said adjustable pulleys.

8. A mechanism of the type described comprising in combination a pair of driven members to be driven in opposite directions, each having an individual pulley means attached thereto for driving it and the two pulleys being positioned coaxial with each other, motor means having a drive shaft parallel to the axis of said pulley means, a second drive shaft and means rotatably supporting it in parallel relation to and at a fixed distance from said motor drive shaft, intermeshing gears on said drive shafts for rotating said second drive shaft from said motor drive shaft in the opposite direction thereto, said means for rotatably supporting said second drive shaft comprising a frame journaled on said motor drive shaft for oscillation thereabout, pulley means on each of said drive shafts juxtaposed to the respective pulley means on said driven members, and belt means for directly coupling said juxtaposed pulley means whereby said driven members are rotated in opposite directions in response to rotation of said motor shaft in one direction, means for oscillating said frame about said motor drive shaft to tighten or loosen the belt means coupling the pulley means on said second drive shaft to the associated pulley means on one of said driven members, the pulley means on said second drive shaft comprising a variable diameter pulley adapted to vary its effective diameter in response to variations in the tension of the associated belt means, a stationary member adjacent said oscillatable frame and means for releasably locking said frame to said stationary member in any desired position in the oscillatory path of said frame.

9. A mechanism as described in claim 8, in which the pulley means on said motor drive shaft and the associated driven member, respectively, comprise sprocket pulleys and the belt means coupling those pulley means comprises a chain belt and in which the pulley means on the other drive and driven members comprise V pulleys and the belt means coupling said V pulleys comprises a V belt.

HERBERT E. TWOMLEY.